(12) United States Patent
Hamamura (10) Patent No.: US 8,760,567 B2
(45) Date of Patent: Jun. 24, 2014

(54) PHOTOGRAPHING APPARATUS AND METHOD TO REDUCE AUTO-FOCUS TIME

(75) Inventor: Toshihiro Hamamura, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 13/332,643

(22) Filed: Dec. 21, 2011

(65) Prior Publication Data

US 2012/0154670 A1   Jun. 21, 2012

(30) Foreign Application Priority Data

Dec. 21, 2010 (JP) ................................. 2010-284092
Nov. 28, 2011 (KR) ........................ 10-2011-0125214

(51) Int. Cl.
*H04N 5/232* (2006.01)

(52) U.S. Cl.
USPC ............................ 348/349; 348/350; 348/353

(58) Field of Classification Search
None
See application file for complete search history.

(56) References Cited

U.S. PATENT DOCUMENTS

| | | | |
|---|---|---|---|
| 7,079,187 B1 * | 7/2006 | Yasuda | 348/345 |
| 8,436,935 B2 * | 5/2013 | Ueda et al. | 348/353 |
| 2005/0046711 A1 * | 3/2005 | Morimoto | 348/240.2 |
| 2005/0099523 A1 * | 5/2005 | Konishi et al. | 348/345 |
| 2005/0157198 A1 * | 7/2005 | Larner et al. | 348/345 |
| 2006/0029377 A1 * | 2/2006 | Stavely et al. | 396/54 |
| 2007/0024738 A1 * | 2/2007 | Kanai et al. | 348/335 |
| 2007/0052837 A1 * | 3/2007 | Onozawa | 348/345 |
| 2008/0025717 A1 * | 1/2008 | Kawanishi | 396/128 |
| 2008/0247741 A1 * | 10/2008 | Yasuda | 396/104 |
| 2011/0050944 A1 * | 3/2011 | Nakamura et al. | 348/222.1 |
| 2012/0162388 A1 * | 6/2012 | Sato | 348/49 |

FOREIGN PATENT DOCUMENTS

| | | |
|---|---|---|
| JP | 2005-070077 | 3/2005 |
| JP | 2006-162990 | 6/2006 |

* cited by examiner

*Primary Examiner* — Twyler Haskins
*Assistant Examiner* — Wesley J Chiu
(74) *Attorney, Agent, or Firm* — Drinker Biddle & Reath LLP (57) ABSTRACT

Photographing apparatus and method to reduce auto-focus time are disclosed. A photographing apparatus is provided that includes two imaging optical systems; an imaging device that converts images of subjects formed by the imaging optical systems into respective image signals; a subject distance calculation unit that calculates subject distances between the imaging device and the subject based on two images generated by the imaging device; and an in-focus position detection unit that detects an in-focus position based on contrast evaluation values of the image signals obtained for a plurality of focusing positions, performs preparatory focusing driving by moving the focusing positions close to the in-focus position based on the calculated subject distances, and scans the focusing positions from the position close to the in-focus position to the in-focus position.

17 Claims, 10 Drawing Sheets

FIRST IMAGE
(LEFT IMAGE)

SECOND IMAGE
(RIGHT IMAGE)

FIG. 7B

IMAGE THAT IS OBTAINED BY
SIMPLY OVERLAPPING IMAGES

IMAGE THAT IS OBTAINED BY
OVERLAPPING IMAGES BASED ON
POSITION OF SUBJECT IN
IN-FOCUS STATE IN MIDDLE OF IMAGES

PHOTOGRAPHING APPARATUS AND METHOD TO REDUCE AUTO-FOCUS TIME

CROSS-REFERENCE TO RELATED PATENT APPLICATIONS

This application claims the priority benefit of Japanese Patent Application No. 2010-284092, filed on Dec. 21, 2010, in the Japan Patent Office; and Korean Patent Application No. 2011-0125214, filed on Nov. 28, 2011, in the Korean Intellectual Property Office, the entireties of which are incorporated herein by reference.

BACKGROUND

1. Field of the Invention

One or more embodiments of the invention relate to a photographing apparatus including at least two imaging optical systems and an imaging device that converts images of a subject formed by the imaging optical systems into image signals, and a photographing method thereof.

2. Description of the Related Art

Digital cameras use an imaging device to perform auto-focusing based on an image signal generated by the imaging device. For example, contrast auto-focusing searches for a focusing position at which a contrast evaluation value of a subject is maximized by varying the focusing position by moving a focusing lens disposed in an imaging optical system, and determines the focusing position with the maximum contrast evaluation value as an in-focus position.

SUMMARY

One or more embodiments of the invention provide a photographing apparatus and method, whereby a time required to perform auto-focusing may be reduced, and a user may select and adjust conveniences, such as an increase in a duration time of a battery, easy framing, and the like.

According to an aspect of the invention, there is provided a photographing apparatus that includes two imaging optical systems that are disposed parallel to each other and having optical axes spaced apart from each other by a predetermined distance; an imaging device that converts images of subjects formed by the imaging optical systems into image signals; an input unit through which a user can input a photographing operation start instruction; a subject distance calculation unit that calculates subject distances between the imaging device and subjects based on two images generated in response to the image signals converted by the imaging device; and an in-focus position detection unit that: detects an in-focus position based on contrast evaluation values of the image signals obtained for a plurality of focusing positions corresponding to positions of the imaging optical systems, which are moving; performs preparatory focusing driving by moving the focusing positions close to the in-focus position based on the calculated subject distances; scans the focusing positions from the position close to the in-focus position to the in-focus position; and switches between a first mode in which preparatory focusing driving is performed before a photographing operation start instruction is input by the user and a second mode in which preparatory focusing driving is performed after a photographing operation start instruction is input by the user.

According to another aspect of the invention, there is provided a photographing method performed using a photographing apparatus comprising two imaging optical systems disposed in parallel to each other and having respective optical axes spaced apart from each other by a predetermined distance, an imaging device that converts images of subjects formed by the imaging optical systems into image signals, and an input unit through which a user can input a photographing operation start instruction, the photographing method comprising: calculating subject distances between the imaging device and subjects based on two images that are generated in response to the image signals converted by the imaging device; and detecting an in-focus position based on contrast evaluation values of the image signals obtained for a plurality of focusing positions corresponding to positions of the imaging optical systems that are moving, wherein detecting the in-focus position comprises performing preparatory focusing driving by moving the focusing positions close to the in-focus position based on the calculated subject distances, scanning driving by moving the focusing positions from the position close to the in-focus position to the in-focus position, and switching from a first mode in which preparatory focusing driving is performed before the photographing operation start instruction is input by the user and a second mode in which preparatory focusing driving is performed after the photographing operation start instruction is input by the user.

By using the above exemplary embodiments, a user may select between a first mode in which preparatory driving is performed before a photographing operation start instruction is input and a second mode in which preparatory driving is performed after the photographing operation start instruction is input. For example, when the user prioritizes reducing a time required for moving the focusing lens and for focusing on a subject rather than reducing power consumed, the focusing lens is always disposed close to the in-focus position by setting the in-focus position detection unit in the first mode in which preparatory driving is performed before a photographing operation start instruction is input to maximize auto-focusing speed. Alternatively, when there is no need to increase auto-focusing speed and the user prioritizes the quality of a live image so as to reduce the power consumed or to perform framing, i.e., the user prioritizes the quality of an image of the subject that is previously displayed on a display unit so as to perform photographing, the in-focus detection unit may be set in the second mode in which preparatory driving is performed after a photographing operation start instruction is input. By using the above structure, the user may increase the auto-focusing speed and may selectively adjust conveniences, such as a reduction in the power consumed, easy framing, and the like.

In addition, because the subject distance calculation unit may calculate an approximate in-focus position by calculating a subject distance of an image without scanning the lens using two imaging optical systems, the in-focus position detection unit may detect a precise in-focus position by only scanning moving the focusing position over a short range and without driving the focusing position in a wrong direction. Thus, a time required for detecting the in-focus position using contrast auto-focusing may be remarkably reduced.

In addition, since the calculation of the subject distance is performed using two imaging optical systems, there is no need to additionally install a measurement sensor, such as a passive external light sensor, and cost is not increased by an increase in the number of components. In addition, since two imaging optical systems are used, problems related to parallax or zooming that occur when an observation optical system, such as an additional sensor, is installed do not occur.

According to an embodiment, the subject distances are calculated based on distances between images of subjects formed on the imaging device and corresponding to the two imaging optical systems, and the optical axes of the imaging device corresponding to the two imaging optical systems or a relative position relationship of the subjects disposed in the two images that are captured by each of the imaging optical systems.

According to an embodiment in which the focusing position is not driven towards the in-focus position in a wrong direction, the driving directions of the focusing positions may be determined based on the calculated subject distances and a current focusing position.

According to an embodiment in which the speed of auto-focusing is increased and simultaneously, the amount of power consumption is reduced both in the first mode before a photographing operation start instruction is input and the second mode after the photographing operation start instruction is input, a first speed of preparatory focusing driving in the first mode and a second speed of preparatory focusing driving in the second mode may be different.

In order to maintain the quality of a live image displayed on a monitor to some degree, or to enable easy framing and simultaneously to dispose the focusing positions of the imaging optical systems close to the in-focus position before photographing starts, the speed of preparatory focusing driving in the first mode may be set to be slower than the speed preparatory focusing driving in the second mode.

In order to perform photographing immediately at a time when a photographing operation start instruction is input and simultaneously to prevent an increase in the amount of power consumption due to unnecessary lens driving before photographing starts, preparatory focusing driving may only be performed in the first mode.

The imaging device may include two imaging devices that correspond to two imaging optical systems, or one imaging device that includes regions corresponding to two imaging optical systems.

BRIEF DESCRIPTION OF THE DRAWINGS

The above and other features and advantages of the invention will become apparent in review of detail exemplary embodiments thereof with reference to the attached drawings, in which.

DETAILED DESCRIPTION

Using contrast auto-focusing, the subject may be focused on with relatively high precision. However, it is difficult to reduce a time required for contrast auto-focusing.

First, when a scanning speed of the focusing lens is increased, a time required for detecting the in-focus position may be reduced. However, when a sampling speed is constant, as the scanning speed of the focusing lens is increased, the number of focusing positions at which the contrast evaluation value is obtained is reduced, and thus a possibility of missing the maximum contrast evaluation value increases. Thus, in order to precisely detect the in-focus position, the scanning speed of the focusing lens may need to be limited. Thus, it is difficult to reduce the time required for focusing by increasing the scanning speed of the focusing lens.

In addition, in order to determine the in-focus position with respect to the focusing position when auto-focusing begins, the focusing lens is driven to determine whether the contrast evaluation value is increasing or decreasing. In other words, since it cannot be known how to vary the focusing position when auto-focusing function starts, the focusing lens needs to be driven in an arbitrary direction. Thus, when the focusing lens is moved in a direction opposite to a direction of the in-focus position, the direction in which the focusing lens is moving needs to be changed, and thus the time required for focusing is lengthened.

Regarding the problems, Japanese Patent Application Publication No. 2005-070077 and Japanese Patent Application Publication No. 2006-162990 each describe a stereoscopic photographing apparatus including two imaging optical systems, whereby, when contrast auto-focusing is performed each imaging optical system scans half of a full driving range of a focusing lens, respectively, so as to reduce a time required for focusing.

In addition, in a photographing apparatus including one imaging optical system and a passive external light sensor, an approximate distance between the photographing apparatus and a subject may be calculated using the passive external light sensor, and a range in which an approximate in-focus position exists is estimated from the distance between the photographing apparatus and the subject, and only the range is scanned while performing contrast auto-focusing. However, since the passive external light sensor is configured as an additional sensor, cost increases and a large space is required. Also, since the passive external light sensor includes an optical system that is separated from the optical system for photographing, a position of the subject or a viewing angle does not coincide with a position of the subject or a viewing angle of the optical system for photographing.

When performing contrast auto-focusing two imaging optical systems whereby a driving range of a focusing lens is shared by each imaging optical system, as disclosed in Japanese Patent Application Publication No. 2005-070077, a distance in which the focusing lens is driven may be reduced by half, but the moving speed of the focusing lens is the same as that of a general photographing apparatus. Thus, it is difficult to further reduce a time required for focusing.

In addition, before a user of a photographing apparatus initiates start of photographing, a focal distance is regularly detected, and the focusing lens is driven near an in-focus position in advance, and after the user initiates exposure operation, the focusing lens is further driven to enter an in-focus state, and thus the time required for auto-focusing is reduced. However, in this case, focusing driving may cause a user to perform unintended framing. Thus, a duration time of a battery may be reduced, it is difficult to see a live image displayed on a monitor due to unnecessary focusing driving, and it is difficult to perform framing, i.e., to determine a composition of a screen by observing an image of a subject in real-time before photographing.

That is, there is no disclosure of a configuration in which auto-focusing is performed at a relatively high speed and the aforementioned problems are overcome, and such a configuration is needed.

The invention will now be described more fully with reference to the accompanying drawings, in which exemplary embodiments of the invention are shown.

Figure 1:
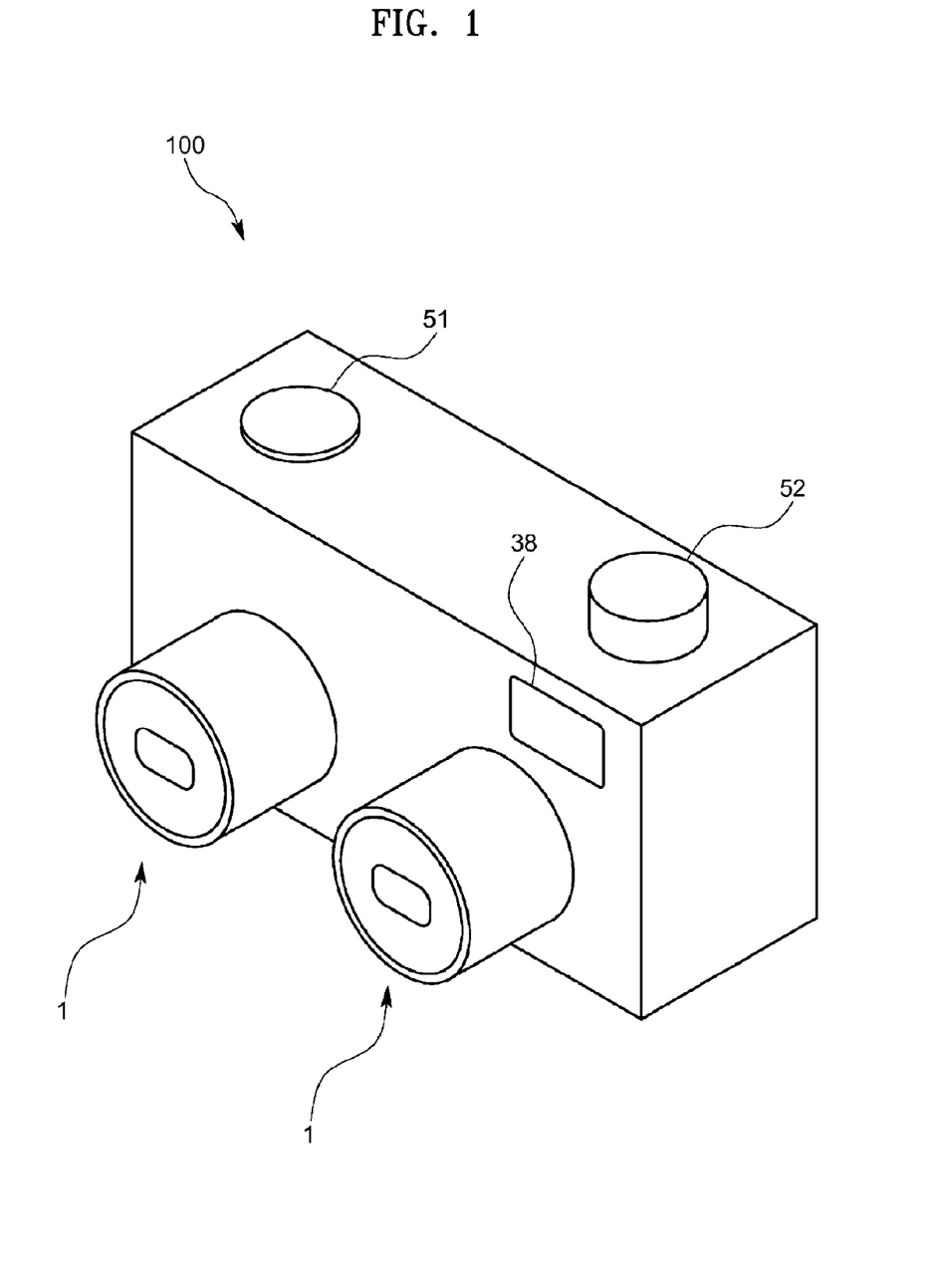
FIG. 1 is a front perspective view schematically illustrating a photographing apparatus, according to an embodiment of the invention.
Figure 2:
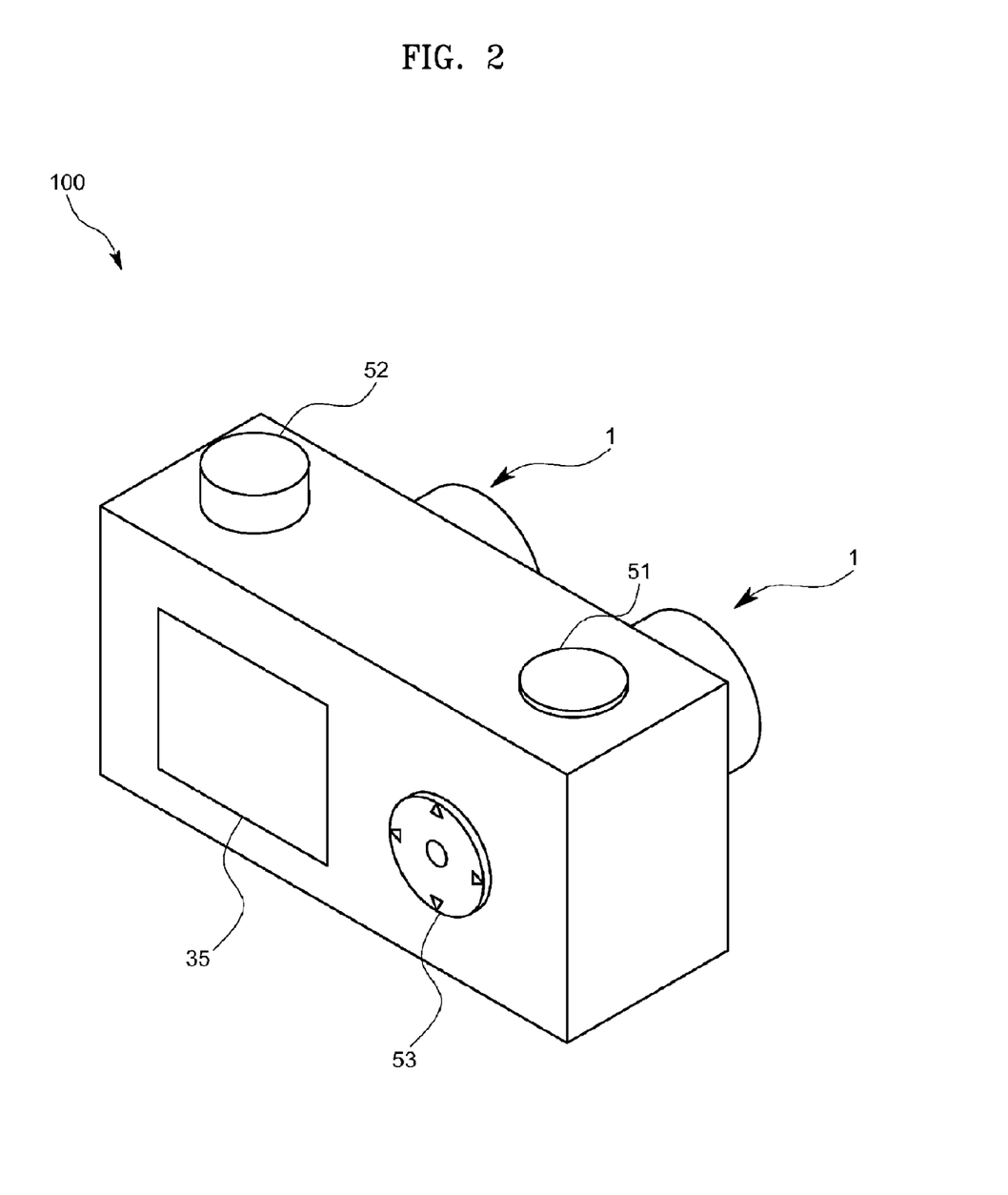
FIG. 2 is a rear perspective view schematically illustrating the photographing apparatus illustrated in FIG. 1.

FIG. 1 is a front perspective view schematically illustrating a photographing apparatus 100, according to an embodiment of the invention, and FIG. 2 is a rear perspective view schematically illustrating the photographing apparatus 100 illustrated in FIG. 1.

The photographing apparatus 100 illustrated in FIGS. 1 and 2 may be used to capture stereoscopic images. Referring to FIG. 1, two lens barrels including two imaging optical systems 1 that are configured to protrude in a powered-on state, and a stroboscopic device 38 are disposed at a front surface of the photographing apparatus 100. The lens barrels may be accommodated within a main body of the photographing apparatus 100 in a powered-off state.

Referring to FIG. 2, a display device 35 such as a liquid crystal display (LCD) for displaying a captured image and a manipulation element 53 for various manipulations are disposed at a rear surface of the photographing apparatus 100. The display device 35 may be a parallax barrier type three-dimensional (3D) monitor, for example. In addition, a shutter button 51 for performing a shutter release operation, and a mode dial 52 for switching a photographing mode are disposed at a top surface of the photographing apparatus 100.

Figure 3:
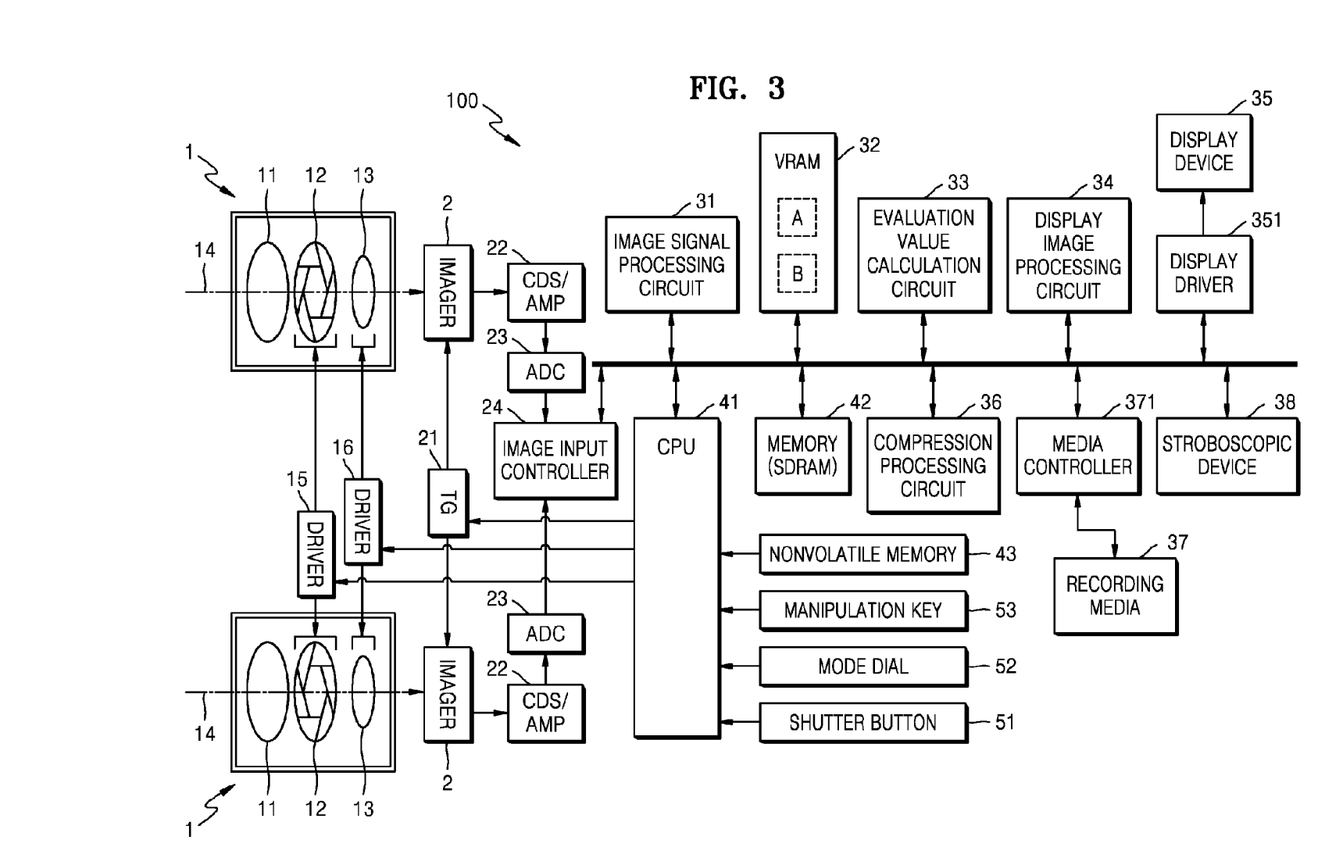
FIG. 3 is a block diagram schematically illustrating a relationship between elements of the photographing apparatus illustrated in FIG. 1.

FIG. 3 is a block diagram schematically illustrating a relationship between elements of the photographing apparatus 100 illustrated in FIGS. 1 and 2.

Referring to FIG. 3, the photographing apparatus 100 includes the two imaging optical systems 1 having their optical axes 14 parallel to each other and spaced apart from each other by a predetermined distance, imaging devices 2 that convert images of a subject formed by the imaging optical systems 1 into image signals, an image signal processing circuit 31, video random access memory (VRAM) 32, an evaluation value calculation circuit 33, a display image processing circuit 34, the display device 35, a compression processing circuit 36, recording media 37, a central processing unit (CPU) 41, volatile memory 42 such as synchronous dynamic random access memory (SDRAM), and nonvolatile memory 43.

The photographing apparatus 100, according to the current embodiment, includes the two imaging devices 2 corresponding to the imaging optical systems 1. However, the invention is not limited thereto, and one imaging device may be provided.

The elements will be described below.

The structure of the two imaging optical systems 1 will now be described. When the two imaging optical systems 1 and the two imaging devices 2 need to be differentiated from each other, the imaging optical system 1 for generating a left image of a stereoscopic image is referred to as a first imaging optical system 1, and the imaging optical system 1 for generating a right image of the stereoscopic image is referred to as a second imaging optical system 1. The imaging optical systems 1 are disposed having their optical axes 14 parallel to each other and spaced apart from each other by a distance that approximately a distance between human eyes. In each imaging optical system 1, a zooming lens 11, an iris 12, and a focusing lens 13 are disposed in this order from a subject side of the imaging optical system 1 along the optical axes 14, and the imaging devices 2 are disposed behind respective ones of the imaging optical systems 1. The imaging devices 2 may be solid-state imaging devices, such as charge-coupled devices (CCDs) or complementary metal-oxide semiconductors (CMOSs).

An iris driving motor 15 is connected to each iris 12 and adjusts amounts of light by varying a value of each iris 12 when an auto-exposure operation is performed. A lens driving motor 16 is connected to each focusing lens 13, and the focusing lenses 13 are configured to adjust focuses of a subject by controlling focusing positions of the imaging optical systems 1 by moving the imaging optical systems 1 (i.e., the focusing lenses 13) along the optical axes 14 when auto-focusing is performed.

The imaging devices 2 convert optical images of a subject formed by the imaging optical systems 1 into electrical image signals. A timing generator (TG) 21 is connected to the imaging devices 2, and optical charge accumulation and transmission operations of the imaging devices 2 are controlled by the TG 21. Also, each iris 12 and each focusing lens 13 are connected to drivers 15 and 16, and the imaging devices 2 connected to the TG 21 are controlled by the CPU 41.

Image signals output from the imaging devices 2 are input to a correlation double sampling/amplifier (CDS/AMP) 22 and an analog to digital (A/D) converter (ADC) 23 and are converted from analog signals into digital signals. Input/output of the image signals is controlled by an image input controller 24. The image signals are input to the image signal processing circuit 31, and gray-scale conversion, white balance correction, gamma correction, and the like the image signal are performed thereon using the image signal processing circuit 31. A first image that is captured by the first imaging optical system 1 and a second image that is captured by the second imaging optical system 1 are stored in predetermined areas A and B of the VRAM 32, respectively. Each of the first and second images stored in the VRAM 32 is updated every predetermined period. In detail, as the imaging devices 2 repeatedly perform exposure and output of image signals every 1/30 second (one frame) using the TG 21, each of the first and second images is updated accordingly.

The evaluation value calculation circuit 33 calculates auto-focusing evaluation values and auto-exposure evaluation values from first and second images stored in the VRAM 32. In the current embodiment, the auto-focusing evaluation values correspond to phase difference evaluation values and contrast evaluation values of the first and second images. The phase difference evaluation values are used in calculating a subject distance, as will be described below. The contrast evaluation values may be calculated by performing an integration operation using brightness values of high frequency components in predetermined areas of the first and second images (for example, a plurality of areas encompassed by lines in FIG. 6). That is, the contrast evaluation values may be obtained by adding up contrast (brightness difference) between adjacent pixels in the predetermined areas. In addition, the auto-exposure evaluation values represent brightness of images that are obtained by performing an integration operation on brightness values in the predetermined areas. The contrast evaluation values and the auto-exposure evaluation values are used to perform auto-focusing and auto-exposure, as described below.

The display image processing circuit 34 synthesizes a stereoscopic image so as to stereoscopically display first and second images stored in the VRAM 32 on the display device 35. When a photographing mode is selected by the mode dial 52, and the display device 35 is used as a view finder, the stereoscopic image synthesized by the display image processing circuit 34 is displayed as a live image on the display device 35 connected to a display driver 351. In addition, the original first and second images stored in the VRAM 32 as well as the synthesized stereoscopic image, may be displayed on the display device 35.

The compression processing circuit 36 compresses images stored in the VRAM 32 using a compression format such as a Joint Photography Experts Group (JPEG) format or a JPEG 2000 format. A media controller 371 stores each of the first and second images compressed by the compression processing circuit 36 in the recording media 37, the SDRAM 42, or the nonvolatile memory 43. In addition, when a view mode is selected using the mode dial 52, a stereoscopic image that is generated by the display image processing circuit 34 based on the first and second images stored in the recording media 37 is displayed on the display device 35.

The display device 35 includes a parallel barrier display layer formed on a surface of the display device 35, although not shown. The display device 35 forms a parallel barrier in the form of patterns in which a light transmitting portion and a light shielding portion are alternately disposed on the parallax barrier display layer at a predetermined pitch when stereoscopic display is performed and simultaneously arranges left and right images on an imaginary image display side alternately and displays the left and right images, thereby realizing a stereoscopic image.

The CPU 41 controls operations of the photographing apparatus 100. The nonvolatile memory 43, as well as the aforementioned shutter button 51, the mode dial 52, and the manipulation key 53 are connected to the CPU 41.

The shutter button 51 corresponds to an input unit and has a two-stage switch structure. When the shutter button 51 is slightly pressed (i.e., half pressed) by a user, a photographing preparation operation starts. In the current embodiment, there is a mode in which auto-focusing starts before the shutter button 51 is half pressed, as will be described below. The mode may be entered by the mode dial 52 or on a setting screen, for example. When the shutter button 51 is deeply pressed (i.e., fully pressed), photographing is performed, and corresponding first and second images are transmitted from the VRAM 32 to the recording media 37, and are stored in the recording media 37.

Various control programs, setting information, and the like are stored in the nonvolatile memory 43.

Figure 4:
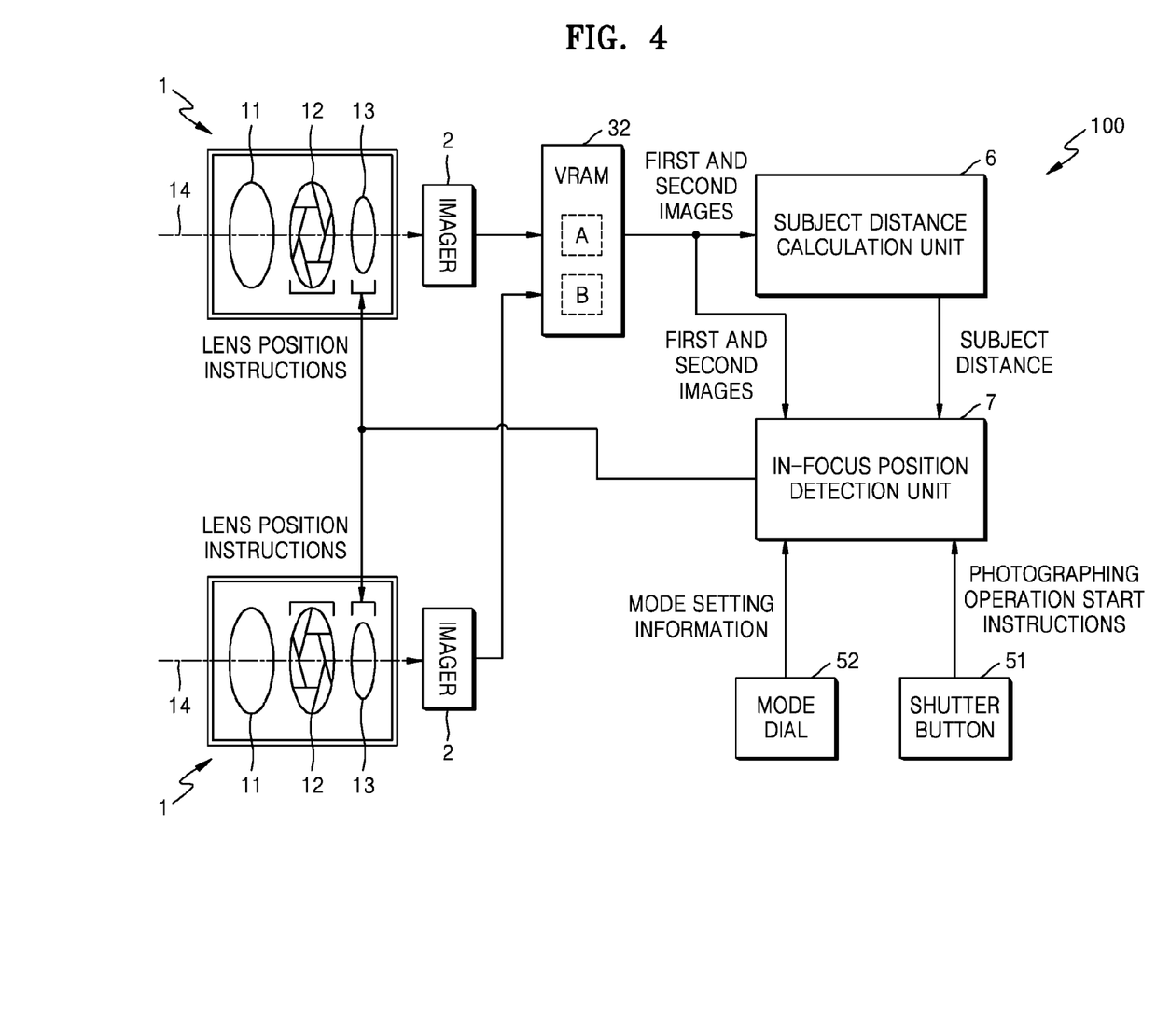
FIG. 4 is a block diagram schematically illustrating a relationship between elements for performing auto-focusing of the photographing apparatus illustrated in FIG. 1.
Figure 5:
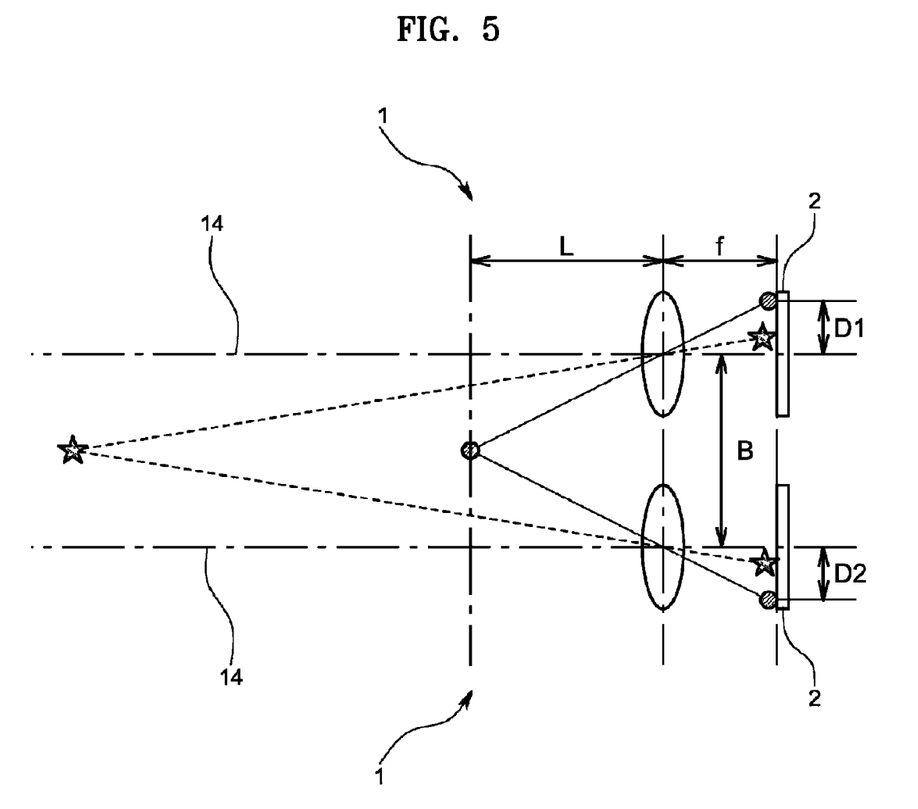
FIG. 5 is a conceptual diagram illustrating a principle of measuring a distance between the photographing apparatus illustrated in FIG. 1 and a subject.
Figure 6:
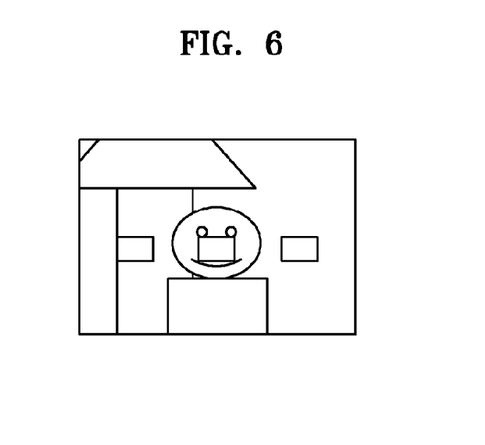
FIG. 6 is a schematic diagram illustrating an evaluation value detection area for measuring a distance between the photographing apparatus illustrated in FIG. 1 and a subject, according to an embodiment of the invention.
Figure 7A:
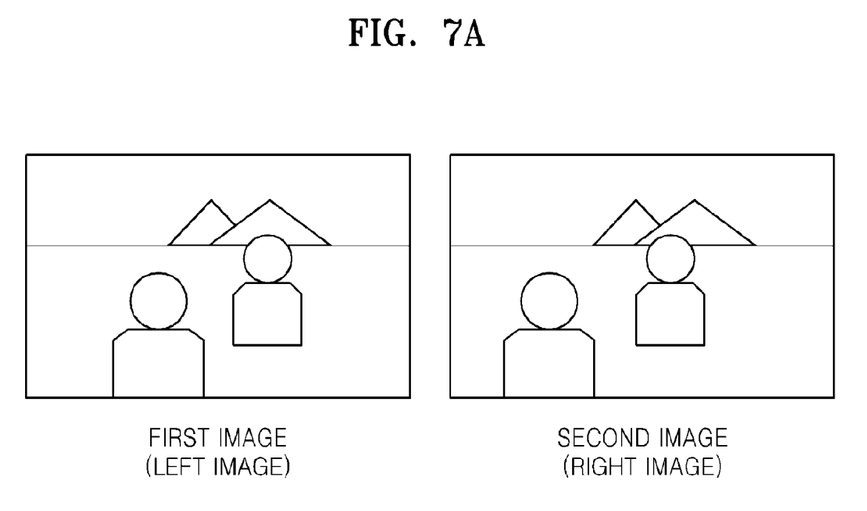
FIGS. 7A and 7B illustrate a method of measuring a distance between a photographing apparatus and a subject, according to another embodiment of the invention.
Figure 7B:
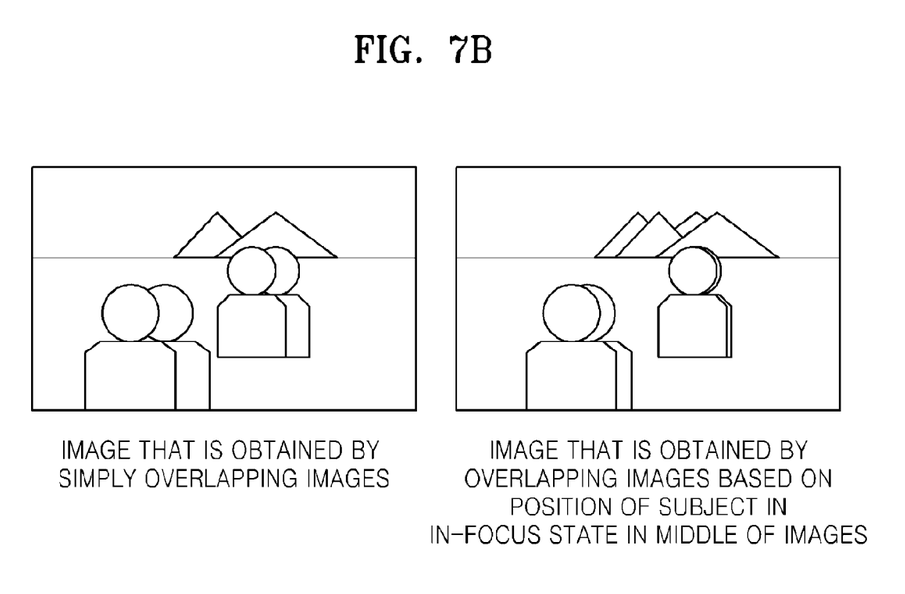
Figure 8:
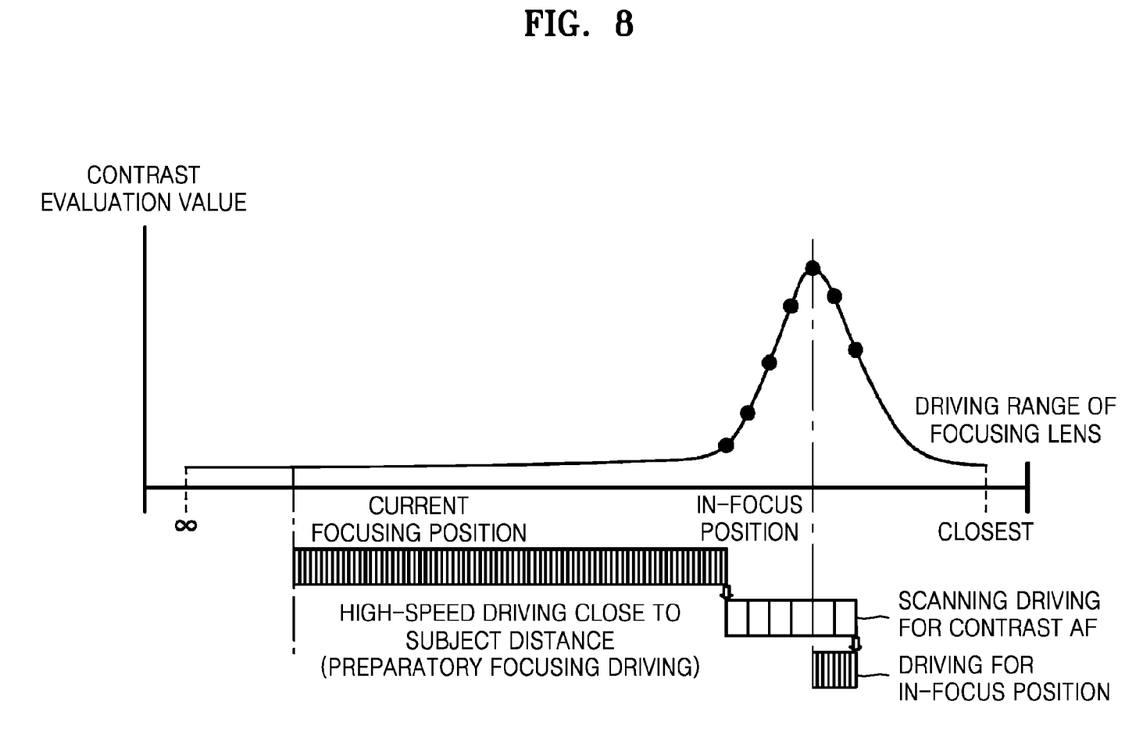
FIG. 8 is a conceptual diagram illustrating an operation of a focusing lens when contrast auto-focusing is performed by the photographing apparatus illustrated in FIG. 1.

FIG. 4 is a block diagram schematically illustrating a relationship between elements for performing auto-focusing for the photographing apparatus 100 illustrated in FIGS. 1 through 3; FIG. 5 is a conceptual diagram illustrating a principle of measuring a distance between the photographing apparatus 100 and a subject; FIG. 6 is a schematic diagram illustrating an evaluation value detection area for measuring a distance between the photographing apparatus 100 and a subject, according to an embodiment of the invention; FIGS. 7A and 7B illustrate a method of measuring a distance between the photographing apparatus 100 and a subject, according to another embodiment of the invention; and FIG. 8 is a conceptual diagram illustrating an operation of a focusing lens when contrast auto-focusing is performed by the photographing apparatus 100.

Referring to FIG. 4, the CPU 41, the SDRAM 42, the nonvolatile memory 43, and various circuits in FIG. 3 are configured to perform a function of a subject distance calculation unit 6 and an in-focus position detection unit 7, as illustrated in FIG. 4, based on a program or setting information.

The subject distance calculation unit 6 is configured to calculate a subject distance between a location of the photographing apparatus 100 and the same subject in two images that are generated in response to image signals that are converted by the imaging devices 2. The subject distance is measured based on a principle of triangulation.

Referring to FIG. 5, since there are two imaging optical systems 1 spaced apart from each other, a position at which images of a subject are formed on the imaging devices 2 varies according to a distance between the imaging optical systems 1 and the subject. Assuming the distance between the optical axes 14 of the imaging optical systems 1 is B, a distance between principal planes of the imaging optical systems 1 and the imaging devices 2 is f, a distance between a position at which light corresponding to the subject is imaged on the first imaging device 2 and the optical axis 14 of the first imaging optical system 1 is D1, a distance between a position at which light corresponding to the subject is imaged on the second imaging device 2 and the optical axis 14 of the second imaging optical system 1 is D2, and a distance between the principal planes of the imaging optical systems 1 and the subject is L, the distance between the imaging optical systems 1 and the subject may be calculated as $L=B\times f/(D1+D2)$, according to lengths of sides of triangles. Here, since f and B are known from setting information regarding the photographing apparatus 100, the distance between the imaging optical systems 1 and the subject may be calculated by calculating D1+D2. D1+D2 is calculated by detecting the positions at which the images of the subject are formed, when first and second images that are captured by the imaging optical systems 1 and the imaging devices 2 and stored in the VRAM 32 are compared by the evaluation value calculation circuit 33. In addition, the distance between the imaging optical systems 1 and the subject may be calculated by the evaluation value calculation circuit 33.

Referring to FIG. 6, the evaluation value calculation circuit 33 calculates D1+D2 relating to subjects in three rectangular edge regions, from an image illustrated in FIG. 6, and outputs distances of the subjects in the regions based on D1+D2. For example, a subject distance of a background in a right-side rectangular edge region is 15 m, a subject distance of a person in a central region is 3.0 m, and a subject distance of a tree trunk in a left-side region is 3.3 m. However, a method of calculating a subject distance is not limited thereto.

Referring to FIGS. 7A and 7B, the evaluation value calculation circuit 33 may be configured to calculate an amount of deviation (D1+D2) of subjects that occurs in images that are generated not by simply overlapping first and second images illustrated in FIG. 7A, as shown on a left side of FIG. 7B, but by overlapping the first and second images of FIG. 7A based on a position of a subject in an in-focus state in a middle of images, as shown on a right side of FIG. 7B.

Referring to FIGS. 4 and 8, the in-focus position detection unit 7 detects an in-focus position based on contrast evaluation values of the image signals obtained from the plurality of focusing positions corresponding to positions of the imaging optical systems 1, which are moving. In detail, the photographing apparatus 100, according to the current embodiment, is configured in such a way that a point at which contrast evaluation values obtained by the evaluation value calculation circuit 33 using the focusing positions of the imaging optical systems 1 are maximized as the focusing lenses 13 are moved is an in-focus position of the subject, and the focusing lenses 13 are moved to the in-focus position of the subject.

In addition, the in-focus position detection unit 7 is configured to perform preparatory focusing driving whereby a focusing position is moved close to an in-focus position at a relatively high speed based on a subject distance calculated by the subject distance calculation unit 6 and scanning whereby, after preparatory focusing driving is performed, the focusing position is moved from the position close to the in-focus position to the in-focus position at a relatively low scanning speed. A subject to be in focus is determined based on a multi-point algorithm for determining the subject to be in focus from subject distances in three regions that are calculated by the subject distance calculation unit 6.

In the multi-point algorithm according to the current embodiment, a subject to be in focus is determined as a subject that is disposed closest to the photographing apparatus 100. However, the invention is not limited thereto. For example, the subject to be in focus may be determined according to a different criterion, such as whether a subject is a person or not. When the subject to be in focus is determined, an in-focus position is calculated from a subject distance of the determined subject, and preparatory focusing driving, the focusing lenses 13 are driven at a relatively high speed to a focusing position close to the in-focus position. Thereafter, low speed scanning is performed so as to detect the in-focus position using contrast auto-focusing by moving the focus position from the position close to the in-focus position to the in-focus position. In order to detect the in-focus position, a position at which a contrast evaluation value is maximized needs to be detected. Thus, while scanning, after the focusing lenses 13 are moved past the position at which the contrast evaluation value is maximized, the focusing lenses 13 are moved to the detected in-focus position at a relatively high speed.

As described above, since a subject distance of a subject to be in focus is calculated by the subject distance calculation unit 6, an in-focus position can be computed, selected, calculated or specified in advance. Thus, when the in-focus position is searched for using contrast auto-focusing, the focusing lenses 13 are not driven in a wrong direction. In addition, the focusing lenses 13 may be driven at a relatively high speed compared to conventional scanning for contrast auto-focusing, and the focusing lenses 13 may be scanned at a relatively low speed in only a relatively limited area. Thus, time required for AF may be remarkably reduced.

In addition, the in-focus detection unit 7 is configured to selectively switch between a first mode in which preparatory focusing driving is performed before the shutter button 51 is pressed by the user and a photographing operation start instruction is input, and a second mode in which preparatory focusing driving is performed after the shutter button 51 is pressed by the user and the photographing operation start instruction is input, by setting a mode using the mode dial 52.

In addition, when preparatory focusing driving is performed before a photographing operation start instruction is input versus after the photographing operation start instruction is input, movement speed of the focusing lenses 13 may be set differently. In detail, the movement speed of the focusing lenses 13 when preparatory driving is performed before a photographing operation start instruction is input may be set to be slower than the movement speed of the focusing lenses 13 when preparatory driving is performed after the photographing operation start instruction is input.

Figure 9:
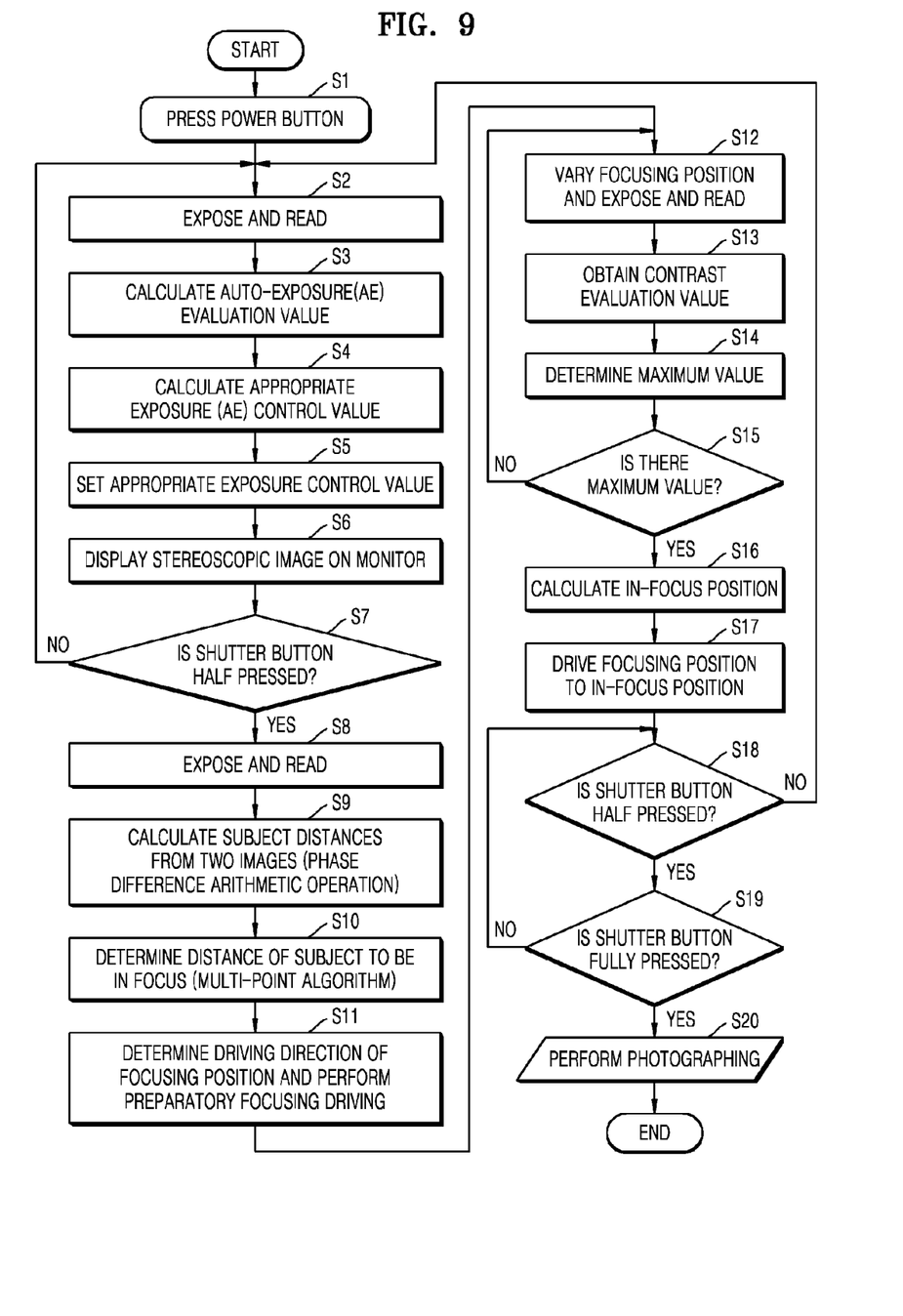
FIG. 9 is a flowchart illustrating an operation of the photographing apparatus illustrated in FIG. 1 in a mode in which preparatory focusing driving is performed after a photographing operation start instruction is input by the user, according to an embodiment of the invention.

FIG. 9 is a flowchart illustrating an operation of the photographing apparatus 100 illustrated in FIGS. 1 through 3 in the second mode in which preparatory driving is performed after a photographing operation start instruction is input, according to an embodiment of the invention.

Referring to FIG. 9, an operation starting from pressing a power button to initiate photographing, in which a mode of the in-focus position detection unit 7 is selected using the mode dial 52 to select the second mode in which preparatory focusing driving is performed after a photographing operation start instruction is input by the user, will be described below.

When a power button is pressed (S1), exposure starts at the imaging devices 2, and images that are generated by the imaging devices 2 are stored in the VRAM 32. The images are read by the evaluation value calculation circuit 33 (S2), and auto-exposure evaluation values are calculated by the evaluation value calculation circuit 33 (S3). Appropriate exposure control values are calculated based on the auto-exposure evaluation values (S4), and an exposure value for each iris 12 is set at the driver 15 of the iris driving motor to correspond to the appropriate exposure control values (S5). A stereoscopic image that is generated by the display image processing circuit 34 is displayed on the display device 35 based on the images in an appropriately-exposed state (S6). Here, since preparatory focusing driving is performed after a photographing operation start instruction is input by the user is selected by the mode dial 52, the subject distance calculation unit 6 and the in-focus position detection unit 7 do not operate until the shutter button 51 is half pressed by the user.

When the shutter button 51 is half pressed by the user (S7), the subject distance calculation unit 6 reads the images appropriately exposed and generated by the imaging devices 2 from the VRAM 32 (S8), and calculates a plurality of subject distances from two images by performing a phase difference arithmetic operation (S9). Thereafter, the in-focus detection unit 7 determines a subject to be in focus based on the plurality of subject distances calculated by the subject distance calculation unit 6 using a multi-point algorithm (S10). The in-focus position detection unit 7 determines a direction in which the focusing lenses 13 are to be driven, based on the subject distances of the determined subject calculated by the subject distance calculation unit 6 and a current focusing position, and performs preparatory focusing driving to move the focusing lenses 13 at a relatively high speed to a position close to the in-focus position, that is, within a predetermined distance from the in-focus position (S11).

When the focusing lenses 13 are moved close to the in-focus position (S11), the in-focus detection unit 7 performs contrast auto-focusing. A new image that is exposed by the imaging device 2 and stored in the VRAM 32 is read by varying the focusing position by performing scanning (S12). Thereafter, the contrast evaluation values calculated by the evaluation value calculation circuit 33 are continuously obtained (S13), and it is determined when the contrast evaluation values is maximized by comparing the currently-obtained contrast evaluation values with previously-obtained contrast evaluation values, and by determining whether increasing of the contrast evaluation values has terminated or not (S14). While increasing of the contrast evaluation values continues, it is determined that the contrast evaluation values have not been maximized (S15), and determination is repeatedly performed until it is determined that the contrast evaluation values have decreased, that is, until the position of the focusing lenses 13 passes the in-focus position, by continuously moving the focusing lenses 13. When the contrast evaluation values have been maximized, the in-focus position is calculated from a position of the maximum values (S16), and the in-focus detection unit 7 moves the focusing lenses 13 to the in-focus position at a relatively high speed by changing the movement direction of the focusing lenses 13 (S17).

When half-pressing of the shutter button 51 is released by the user, the operation goes back to operation S2 (S18), and when the shutter button 51 is fully pressed (S19), photographing is performed in the in-focus position (S20).

Figure 10:
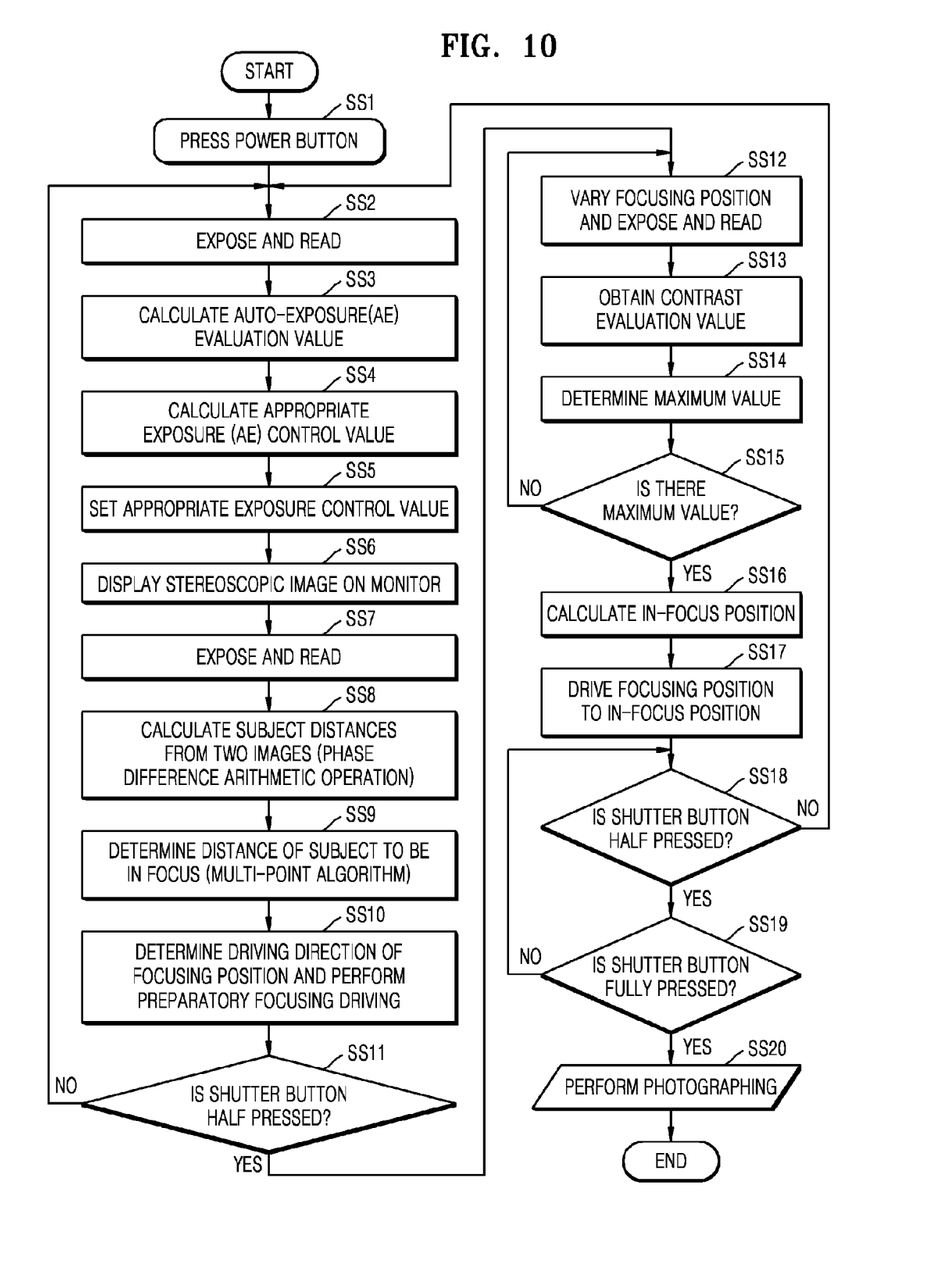
FIG. 10 is a flowchart illustrating an operation of the photographing apparatus illustrated in FIG. 1 in a mode in which preparatory focusing driving is performed before a photographing operation start instruction is input by the user, according to another embodiment of the invention.

FIG. 10 is a flowchart illustrating an operation of the photographing apparatus 100 illustrated in FIG. 1 in the first mode in which preparatory focusing driving is performed before a photographing operation start instruction is input, according to another embodiment of the invention.

Referring to FIG. 10, when the first mode in which preparatory focusing driving is performed before a photographing operation start instruction is input by the user is selected by the mode dial 52, the subject distance calculation unit 6 and the in-focus detection unit 7 perform nearly the same operations as for the second mode in which preparatory focusing driving is performed after a photographing operation start instruction is input by the user, as described above in connection with FIG. 9. Thus, a difference between operations in the first mode in which preparatory focusing driving is performed before a photographing operation start instruction is input by the user and the second mode in which preparatory focusing driving is performed after a photographing operation start instruction is input by the user will be described below.

When the first mode in which preparatory focusing driving is performed before a photographing operation start instruction is input by the user is selected, operations SS1 to SS6 may be performed before a photographing operation start instruction is input by the user are the same as operations S1 to S6 in the second mode in which preparatory focusing driving is performed after a photographing operation start instruction is input by the user, described above in connection with FIG. 9. In the first mode, there is a difference in that operations S8 to S11 in the second mode are performed after a photographing operation start instruction is input by the user are performed before the shutter button 51 is half pressed by the user.

That is, as illustrated in FIG. 10, the subject distance calculation unit 6 reads images that are exposed and generated by the imaging devices 2 from the VRAM 32 (SS7), and calculates subject distances from two images by performing a phase difference arithmetic operation (SS8). Thereafter, the in-focus position detection unit 7 determines a subject to be in focus based on the plurality of subject distances calculated by the subject distance calculation unit 6 using a multi-point algorithm (SS9). The in-focus position detection unit 6 determines a direction in which the focusing lenses 13 are to be driven, based on the subject distance of the determined subject calculated by the subject distance calculation unit 6 and performs preparatory focusing driving to move the focusing lenses 13 at a relatively high speed to a position close to the in-focus position, that is, within a predetermined distance from the in-focus position (SS10). Since operations SS7 to SS10 are repeatedly performed until the shutter button 51 is half pressed by the user, the focusing lenses 13 are always maintained to be disposed close to the in-focus position. In this case, when the movement speed of the focusing lenses 13 is excessively fast, the quality of an image displayed on the display device 35 may be lowered, or the focusing lenses 13 need to be continuously driven and thus an amount of power consumed increases. In order to address these problems, the speed of preparatory focusing driving in the first mode is set to be slower than that in the second mode.

When the shutter button 51 is half pressed by the user (SS11), the in-focus position detection unit 7 starts searching for the in-focus position by performing contrast auto-focusing. Operations SS12 to SS20 in the first mode are the same as operations S12 to S20 in the second mode (see FIG. 9), and thus descriptions thereof will not be repeated here.

Since the focusing lenses 13 are disposed close to the in-focus position before the shutter button 51 is half pressed, a range of scanning driving is substantially reduced, and thus the focusing lenses 13 may be moved to the in-focus position within a relatively short time. That is, when the first mode is set, the subject is nearly in an in-focus state before the user half presses the shutter button 51, and when the user half presses the shutter button 51, the in-focus state may be rapidly achieved, and thus a subject that moves relatively fast may be easily focused on. Contrary to this, when the second mode is set, focusing speed may not be as fast, but the quality of a live image that is displayed on the display device 35 may be improved while power is saved. Thus, the second mode may be more suitable for a case where framing is performed slowly, or time required for operating the photographing apparatus 100 is relatively great.

As described above, the in-focus position detection unit 7 may select the first mode in which preparatory focusing driving is performed before a photographing operation start instruction is input by the user or the second mode in which preparatory focusing driving is performed after a photographing operation start instruction is input by the user, and thus the user may adjust the focusing speed conveniently.

Figure 11:
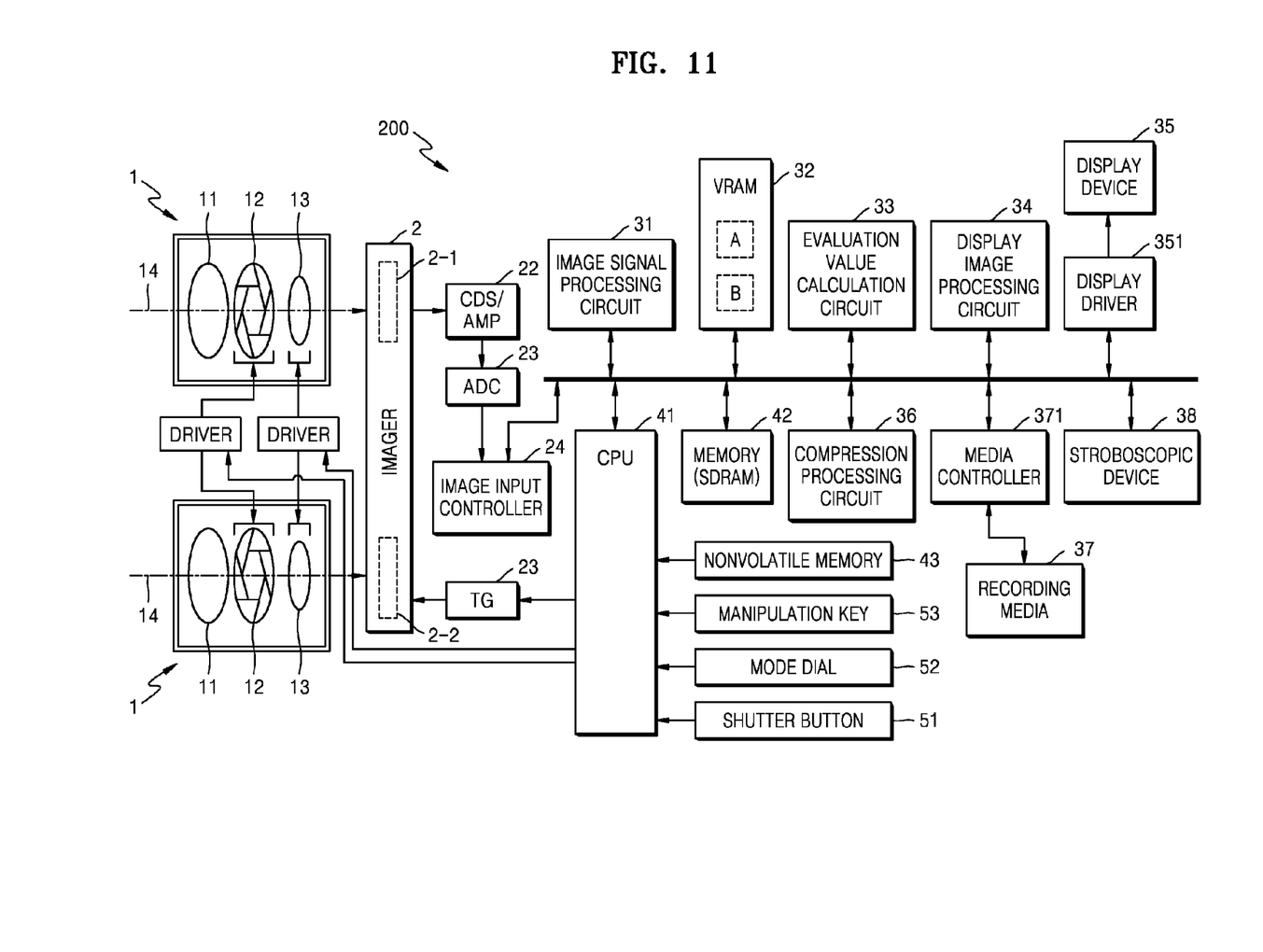
FIG. 11 is a block diagram schematically illustrating a relationship between elements of a photographing apparatus, according to another embodiment of the invention

FIG. 11 is a block diagram schematically illustrating a relationship between elements of a photographing apparatus 200, according to another embodiment of the invention.

Referring to FIG. 11, elements of the photographing apparatus 200 according to the current embodiment are the same as those of the photographing apparatus 100 illustrated in FIG. 3, and the only difference between FIGS. 3 and 11 is that the photographing apparatus 200 includes only one imaging device 2.

The imaging device 2 includes a first region 2-1 and a second region 2-2 that correspond to the two imaging optical systems 1, and converts left and right images of a subject formed by the imaging optical systems 1 in each of the first region 2-1 and the second regions 2-2 into image signals, respectively.

The image signals converted by the imaging device 2 are input to a CDS/AMP 22 and an ADC 23, and are converted from analog signals into digital signals.

In the photographing apparatus 100 illustrated in FIG. 3, two imaging devices 2 obtain a first image and a second image that correspond to left/right images so that subject distances between the imaging devices 2 and subjects are calculated from two images that are generated in response to the image signals converted by the imaging devices 2.

In the photographing apparatus 200 according to the current embodiment, one imaging device 2 obtains a first image and a second image from the first region 2-1 and the second region 2-2. However, subject distances between the imaging device 2 and subjects may be calculated from two images based on the same principle as the photographing apparatus 100 of FIG. 3, i.e., based on a principle of triangulation or an amount of deviation of the first image and the second image.

Here, the first imaging device 2 and the second imaging device 2 that are used for explaining a principle of measuring subject distances illustrated in FIG. 5, correspond to the first region 2-1 and the second region 2-2 of the imaging device 2, respectively.

A configuration and method of performing auto-focusing after the subject distances are calculated by the photographing apparatus 200 of FIG. 11 is the same as that of the photographing apparatus 100 and thus, descriptions thereof will not be repeated.

Hereinafter, other embodiments will be described.

In the above-described embodiments, the speed of preparatory focusing driving when preparatory focusing driving is performed before a photographing operation start instruction is input by the user and the speed of preparatory focusing driving when preparatory focusing driving is performed after a photographing operation start instruction is input by the user are different from each other. However, other parameters may be set different. For example, a period in which a subject distance is calculated using the subject distance calculation unit 6 may be increased when preparatory focusing driving is performed before a photographing operation start instruction is input by the user compared when preparatory focusing driving is performed after a photographing operation start instruction is input by the user, and a frequency or rate of driving the focusing lenses 13 disposed close to the in-focus position may be decreased. According to this configuration, even when the speed of preparatory focusing driving when preparatory focusing driving is performed after a photographing operation start instruction is input by the user and the speed of preparatory focusing driving when preparatory focusing driving is performed before a photographing operation start instruction is input by the user are the same, an increase in power consumed caused by fine driving of the focusing lens 13 may be prevented.

In the above-described embodiments, preparatory focusing driving may be been performed when preparatory focusing driving is performed before a photographing operation start instruction is input by the user. However, when focusing speed is to be prioritized, scanning may be performed to maintain the in-focus state.

The method of calculating a subject distance and the method of calculating a contrast evaluation value described in the current embodiment are just examples, and a subject distance and a contrast evaluation value may be calculated using other methods. In addition, the photographing apparatus according to the current embodiment has been described as a photographing apparatus for performing stereoscopic photographing. However, there may be a mode in which a general planar image may be captured using only one imaging optical system, for example.

In the above-described embodiments, the subject is in focus by driving only the focusing lens 13 but may be in focus by driving a zooming lens. Although, in the above-described embodiments, moving of the focusing lenses 13 and moving of the focusing position are in a one-to-one correspondence, any other driving systems for moving the focusing position may be used.

Unless not complying with the purpose of the invention, various modifications or combinations of embodiments may be possible.

As described above, in a photographing apparatus and method according to the one or more embodiments of the invention, since an in-focus position detection unit can operate in two modes, such as the first mode in which preparatory focusing driving is performed before a photographing operation start instruction is input by a user and the second mode in which preparatory focusing driving is performed after a photographing operation start instruction is input by the user, when the user prioritizes the speed of auto-focusing, the user may select the mode in which preparatory driving is performed before a photographing operation start instruction is input by the user, and when the speed of auto-focusing is maintained to some degree and the user prioritizes conveniences, such as a reduction in power consumed, easy framing, and the like, the user may select the mode in which preparatory driving is performed after a photographing operation start instruction is input by the user.

In one or more embodiments of the invention, two modes between which the user may select in accordance with the user's need, may be provided. Thus, a balance between the speed of auto-focusing and conveniences may be achieved.

The embodiments disclosed herein may include a memory for storing program data, a processor for executing the program data to implement the methods and apparatus disclosed herein, a permanent storage such as a disk drive, a communication port for handling communication with other devices, and user interface devices such as a display, a keyboard, a mouse, etc. When software modules are involved, these software modules may be stored as program instructions or computer-readable codes, which are executable by the processor, on a non-transitory or tangible computer-readable media such as a read-only memory (ROM), a random-access memory (RAM), a compact disc (CD), a digital versatile disc (DVD), a magnetic tape, a floppy disk, an optical data storage device, an electronic storage media (e.g., an integrated circuit (IC), an electronically erasable programmable read-only memory (EEPROM), a flash memory, etc.), a quantum storage device, a cache, and/or any other storage media in which information may be stored for any duration (e.g., for extended time periods, permanently, for brief instances, for temporary buffering, for caching, etc.). As used herein, a computer-readable storage medium expressly excludes any computer-readable media on which signals may be propagated. However, a computer-readable storage medium may include internal signal traces and/or internal signal paths carrying electrical signals thereon.

Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of this disclosure, reference has been made to the embodiments illustrated in the drawings, and specific language has been used to describe these embodiments. However, no limitation of the scope of this disclosure is intended by this specific language, and this disclosure should be construed to encompass all embodiments that would normally occur to one of ordinary skill in the art in view of this disclosure.

Disclosed embodiments may be described in terms of functional block components and various processing steps. Such functional blocks may be realized by any number of hardware and/or software components configured to perform the specified functions. For example, the embodiments may employ various integrated circuit components (e.g., memory elements, processing elements, logic elements, look-up tables, and the like) that may carry out a variety of functions under the control of one or more processors or other control devices. Similarly, where the elements of the embodiments are implemented using software programming or software elements, the embodiments may be implemented with any programming or scripting language such as C, C++, Java, assembler, or the like, using any combination of data structures, objects, processes, routines, and other programming elements. Functional aspects may be implemented as instructions executed by one or more processors. Furthermore, the embodiments could employ any number of conventional techniques for electronics configuration, signal processing, control, data processing, and the like. The words "mechanism" and "element" are used broadly and are not limited to mechanical or physical embodiments, but can include software routines in conjunction with processors, etc.

The particular implementations shown and described herein are illustrative examples and are not intended to otherwise limit the scope of this disclosure in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments unless the element is specifically described as "essential" or "critical".

The use of the terms "a," "an," "the," and similar referents in the context of describing the embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. Moreover, one or more of the blocks and/or interactions described may be changed, eliminated, sub-divided, or combined; and disclosed processes may be carried out sequentially and/or carried out in parallel by, for example, separate processing threads, processors, devices, discrete logic, circuits, etc. The examples provided herein and the exemplary language (e.g., "such as" or "for example") used herein are intended merely to better illuminate the embodiments and does not pose a limitation on the scope of this disclosure unless otherwise claimed. In view of this disclosure, numerous modifications and adaptations will be readily apparent to those skilled in this art without departing from the spirit and scope of this disclosure.

While the invention has been particularly shown and described with reference to exemplary embodiments thereof, it will be understood by those of ordinary skill in the art that various changes in form and details may be made therein without departing from the spirit and scope of this disclosure.

What is claimed is:

1. A photographing apparatus comprising:
   two imaging optical systems that are disposed parallel to each other and having optical axes spaced apart from each other by a predetermined distance;
   an imaging device that converts images of subjects formed by the imaging optical systems into respective image signals;
   an input unit through which a user can input a photographing operation start instruction;
   a subject distance calculation unit that calculates subject distances between the imaging device and a subject based on two images generated in response to the image signals converted by the imaging device; and
   an in-focus position detection unit that:
      detects an in-focus position based on contrast evaluation values of the image signals obtained for a plurality of focusing positions corresponding to positions of the imaging optical systems, which are moving,
      performs preparatory focusing driving by moving the focusing positions close to the in-focus position based on the subject distances calculated by the subject distance calculation unit,
      scans the focusing positions from the position close to the in-focus position to the in-focus position after preparatory focusing driving is performed, and
      switches between a first mode in which preparatory focusing driving is performed before the photographing operation start instruction is input and a second mode in which preparatory focusing driving is performed after the photographing operation start instruction is input;
   wherein a first speed of preparatory focusing driving in the first mode is selected to be slower than a second speed of preparatory focusing driving in the second mode.

2. The photographing apparatus of claim 1, wherein the subject distance calculation unit calculates the subject distances based on distances between images of the subject formed on the imaging device and corresponding to the two imaging optical systems, and the optical axes of the imaging device corresponding to the two imaging optical systems.

3. The photographing apparatus of claim 1, wherein the subject distance calculation unit calculates the subject distances based on a relative position relationship of the subject disposed in the two images formed by each of the imaging optical systems.

4. The photographing apparatus of claim 1, wherein the in-focus detection unit determines driving directions of the focusing positions based on the subject distances calculated by the subject distance calculation unit and a current focusing position.

5. The photographing apparatus of claim 1, wherein the in-focus detection unit sets different preparatory focusing driving speeds for the first and second modes.

6. The photographing apparatus of claim 1, wherein the in-focus detection unit performs only preparatory focusing driving in the first mode.

7. The photographing apparatus of claim 1, wherein the imaging device comprises a first imaging device and a second imaging device that correspond to the two imaging optical systems, respectively.

8. The photographing apparatus of claim 1, wherein the imaging device comprises a first region and a second region that correspond to the two imaging optical systems, respectively.

9. The photographing apparatus of claim 1, wherein the in-focus detection unit switches between the first mode, in which preparatory focusing driving is performed before the photographing operation start instruction is input and scanning is performed after the photographing operation start instruction is input, and the second mode, in which preparatory focusing driving and scanning are performed after the photographing operation start instruction is input.

10. A photographing method performed using a photographing apparatus comprising two imaging optical systems disposed in parallel to each other and having respective optical axes spaced apart from each other by a predetermined distance, an imaging device that converts images of a subject formed by the imaging optical systems into image signals, and an input unit through which a user can input a photographing operation start instruction, the photographing method comprising:

calculating subject distances between the imaging device and the subject based on two images that are generated in response to the image signals converted by the imaging device; and detecting an in-focus position based on contrast evaluation values of the image signals obtained for the plurality of focusing positions corresponding to positions of the imaging optical systems, which are moving, wherein detecting the in-focus position comprises:

performing preparatory focusing driving by moving the focusing positions close to the in-focus position based on the calculated subject distances, scanning driving by moving the focusing positions from the position close to the in-focus position to the in-focus position after preparatory focusing driving is performed, and switching between a first mode in which preparatory focusing driving is performed before the photographing operation start instruction is input and a second mode in which preparatory focusing driving is performed after the photographing operation start instruction is input;

wherein a first speed of preparatory focusing driving in the first mode is slower than a second speed of preparatory focusing driving in the second mode.

11. The photographing method of claim 10, wherein calculating the subject distances comprises calculating the subject distances based on distances between images of the subject formed on the imaging device and corresponding to the two imaging optical systems, and the optical axes of the imaging device corresponding to the two imaging optical systems.

12. The photographing method of claim 10, wherein calculating the subject distances comprises calculating the subject distances based on a relative position relationship of the subject disposed in the two images formed by each of the imaging optical systems.

13. The photographing method of claim 10, wherein detecting the in-focus position comprises determining driving directions of the focusing positions based on the calculated subject distances and a current focusing position.

14. The photographing method of claim 10, wherein detecting the in-focus position comprises setting different preparatory focusing driving speeds for the first and second modes.

15. The photographing method of claim 10, wherein detecting the in-focus position comprises performing only preparatory focusing driving in the first mode.

16. The photographing method of claim 10, wherein switching comprises:

switching between a first mode, in which preparatory focusing driving is performed before the photographing operation start instruction is input and scanning driving is performed after the photographing operation start instruction is input, and a second mode, in which preparatory focusing driving and scanning driving are performed after the photographing operation start instruction is input.

17. A non-transitory computer-readable medium storing instructions that, when executed, cause a photographing apparatus to at least carry out the method of claim 10.

* * * * *